(12) United States Patent
Sutter

(10) Patent No.: US 7,467,471 B1
(45) Date of Patent: Dec. 23, 2008

(54) MULTI PURPOSE ADJUSTABLE MEASURING GAUGE

(76) Inventor: John Norman Sutter, 13310 NW. Marina Way, Portland, OR (US) 97231

( * ) Notice: Subject to any disclaimer, the term of this patent is extended or adjusted under 35 U.S.C. 154(b) by 32 days.

(21) Appl. No.: 11/821,677

(22) Filed: Jun. 25, 2007

(51) Int. Cl.
*G01B 5/14* (2006.01)
*B43L 13/00* (2006.01)

(52) U.S. Cl. .................... 33/194; 33/27.03; 33/464
(58) Field of Classification Search ............. 33/194, 33/27.02, 27.03, 27.031, 452, 464, 809, 810, 33/811, 812, 484, 485
See application file for complete search history.

(56) References Cited

U.S. PATENT DOCUMENTS

| 144,003 | A | * | 10/1873 | Waterbury | 33/465 |
| 408,496 | A | * | 8/1889 | Macker | 33/194 |
| 413,930 | A | * | 10/1889 | Driscoll | 33/511 |
| 3,562,773 | A | * | 2/1971 | Wilamowski | 33/812 |
| 4,930,221 | A | * | 6/1990 | Taylor | 33/811 |
| 5,410,816 | A | * | 5/1995 | Ruggiero | 33/527 |
| 6,134,797 | A | * | 10/2000 | Boyce | 33/464 |
| 6,305,091 | B1 | * | 10/2001 | Tegels | 33/194 |
| 6,546,634 | B2 | * | 4/2003 | Ming | 33/27.032 |
| 7,069,659 | B1 | * | 7/2006 | Rye | 33/194 |
| 2002/0170189 | A1 | * | 11/2002 | Cheatham | 33/194 |

* cited by examiner

*Primary Examiner*—Christopher W Fulton
(74) *Attorney, Agent, or Firm*—Mark S. Hubert

(57) ABSTRACT

The present invention relates to novel woodworking tool. This tool allows for precise measurements of square ends; square/mitered end combination, and mitered ends. Additionally, this tool can scribe arcs and circles and square up cabinets and other structures. This simple to operate tool will ensure proper measurements for difficult inside and outside dimensions critical for fine woodworking and cabinetry.

15 Claims, 8 Drawing Sheets

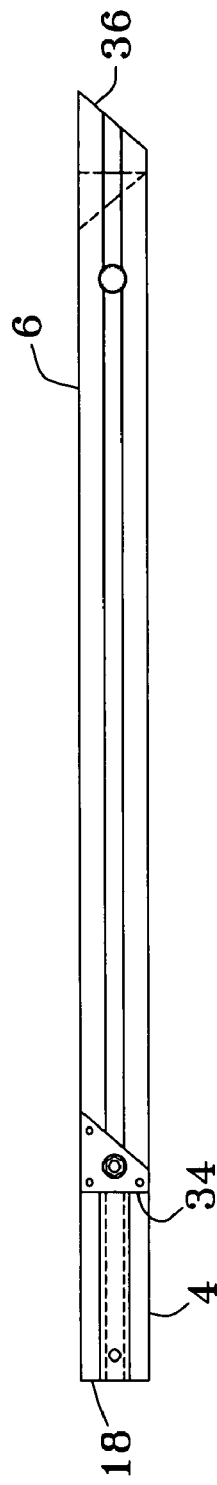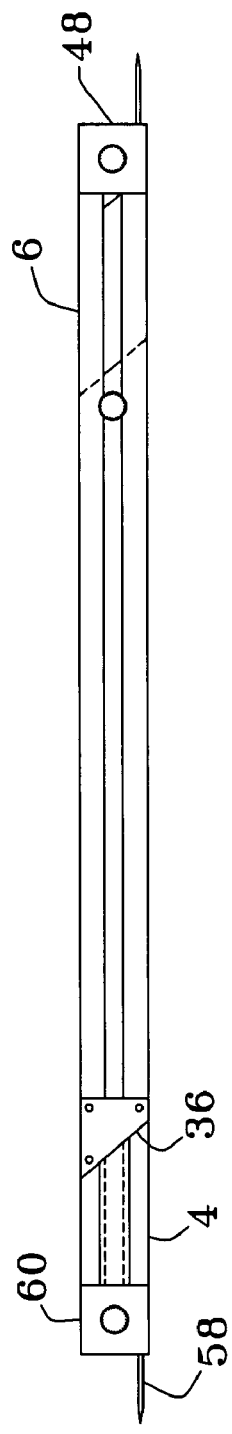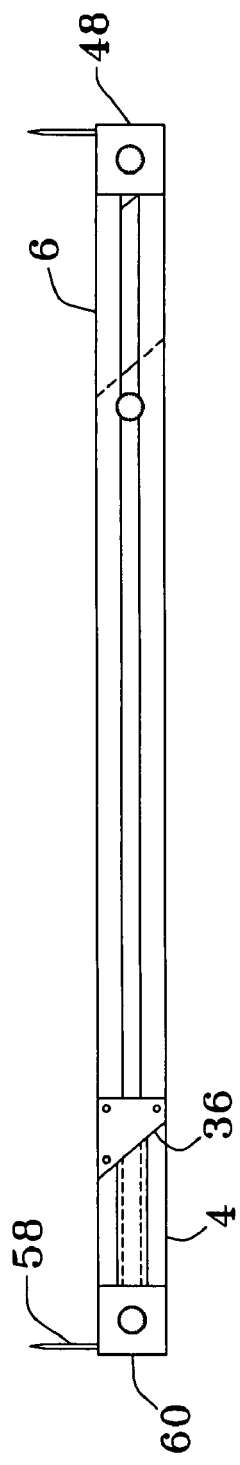

MULTI PURPOSE ADJUSTABLE MEASURING GAUGE

BACKGROUND OF THE INVENTION

The present invention relates to a novel woodworking tool for precisely measuring difficult inside and outside dimensions critical for fine woodworking and cabinetry. More particularly, it relates to a woodworking gauge that can measure square ends, measure square/mitered end combinations, measure mitered ends, scribe arcs, and check diagonal squareness of cabinets and other structures.

Fine woodworking projects require precise measurements before preforming cuts and/or assembly. Often, numerous tools are required to ensure proper measurements. Accurately measuring inside dimensions of windows or cabinets, for example, is difficult with a measuring tape. Once this gauge is locked to the exact dimensions, the tool can create a pattern for a new piece of trim with mitered or square corners by setting a saw stop, fence, or by scribing a knife line on top of the stock from which you are creating the new piece. Additionally, trammel points for making circles and arcs can be removably affixed at either end. By rotating the trammel points to extend from both ends of the gauge, the gauge can be used to measure diagonals, which is useful for squaring up cabinets and other structures.

Prior art woodworking devices have been to designed to do each of the aforementioned actions; however, no prior art discloses a gauge that does all of the aforementioned actions. Therefore, there is a need for a woodworking gauge that is simple to operate and can measure square ends, measure square/mitered end combinations, measure mitered ends, scribe arcs, and square up cabinets and other objects. This need will be achieved by the novel invention herein disclosed.

SUMMARY OF THE INVENTION

The general purpose of the present invention, which will be described subsequently in greater detail, is to provide a multi-use woodworking gauge. The gauge has many of the advantages mentioned heretofore and many novel features that result in a new woodworker's gauge which is not anticipated, rendered obvious, suggested, or even implied by any of the prior art, either alone or in any combination thereof.

In accordance with the invention, an object of the present invention is to provide an improved woodworker's gauge capable of precisely measuring inside and outside dimensions for fine woodworking projects.

It is another object of this invention to provide an improved woodworker's gauge capable of measuring and setting a pattern for square ends.

It is a further object of this invention to provide an improved woodworker's gauge capable of measuring and setting a pattern for mitered ends.

It is a further object of this invention to provide an improved woodworker's gauge capable of measuring and setting a pattern for square/mitered end combinations.

It is still a further object of this invention to provide an improved woodworker's gauge cable of measuring and setting a pattern for a right-handed miter.

It is still a further object of this invention to provide an improved woodworker's gauge cable of measuring and setting a pattern for a left-handed miter.

It is still a further object of this invention to provide an improved woodworker's gauge cable of scribing arcs and circles.

It is yet a further object of this invention to provide an improved woodworker's gauge cable of measuring inside diagonals and hence squaring up cabinets and other structures.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

Other objects, features and aspects of the present invention are discussed in greater detail below.

BRIEF DESCRIPTION OF THE DRAWINGS

FIG. 18 is a top view of a fourth assembly configuration of the multi function gauge;

FIG. 19 is a top view of a fifth assembly configuration of the multi function gauge;

FIG. 20 is a top view of a sixth assembly configuration of the multi function gauge;

DETAILED DESCRIPTION

Figure 1:
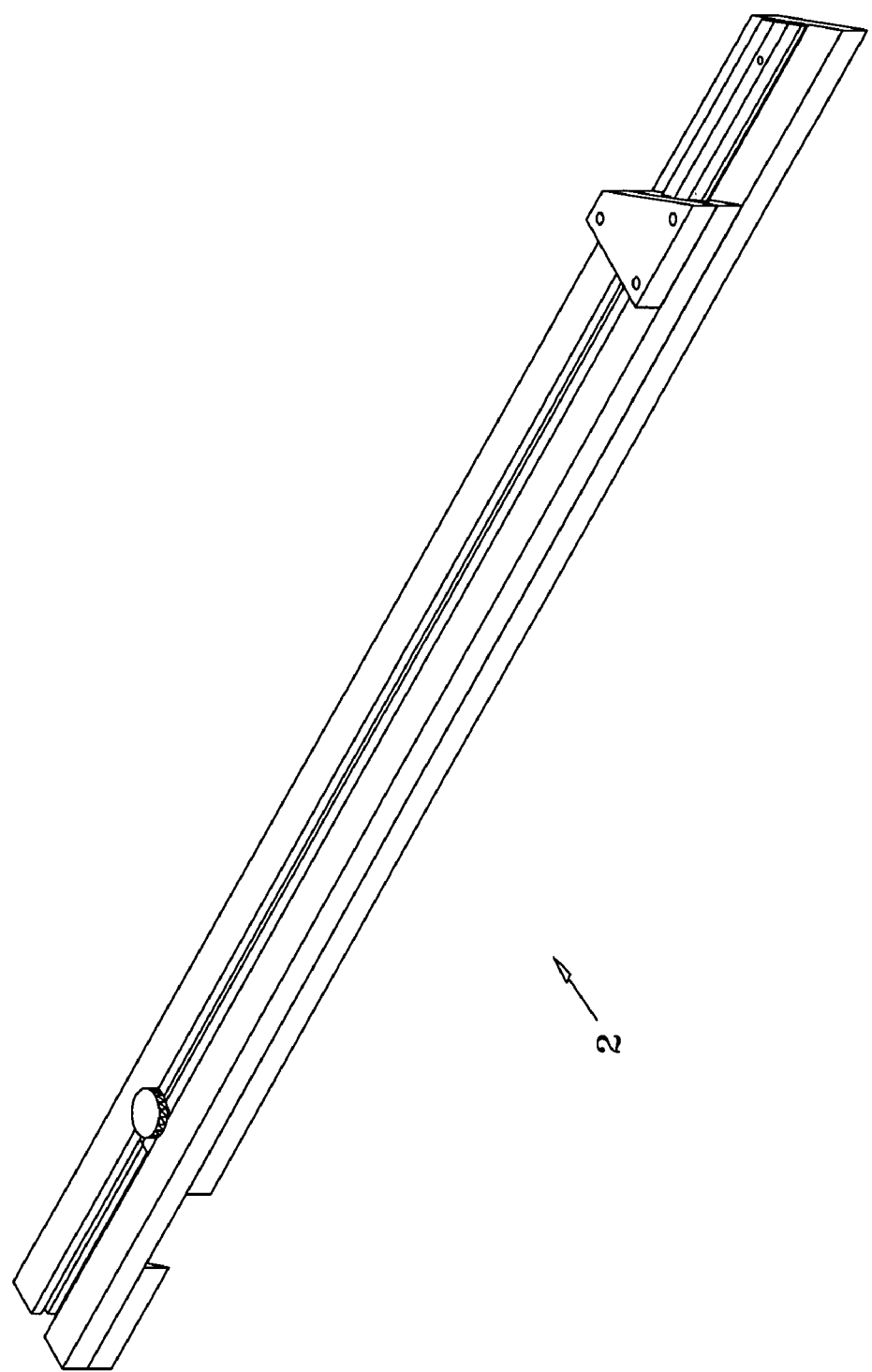
FIG. 1 is a first view isometric projection of the multi function gauge.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 2:
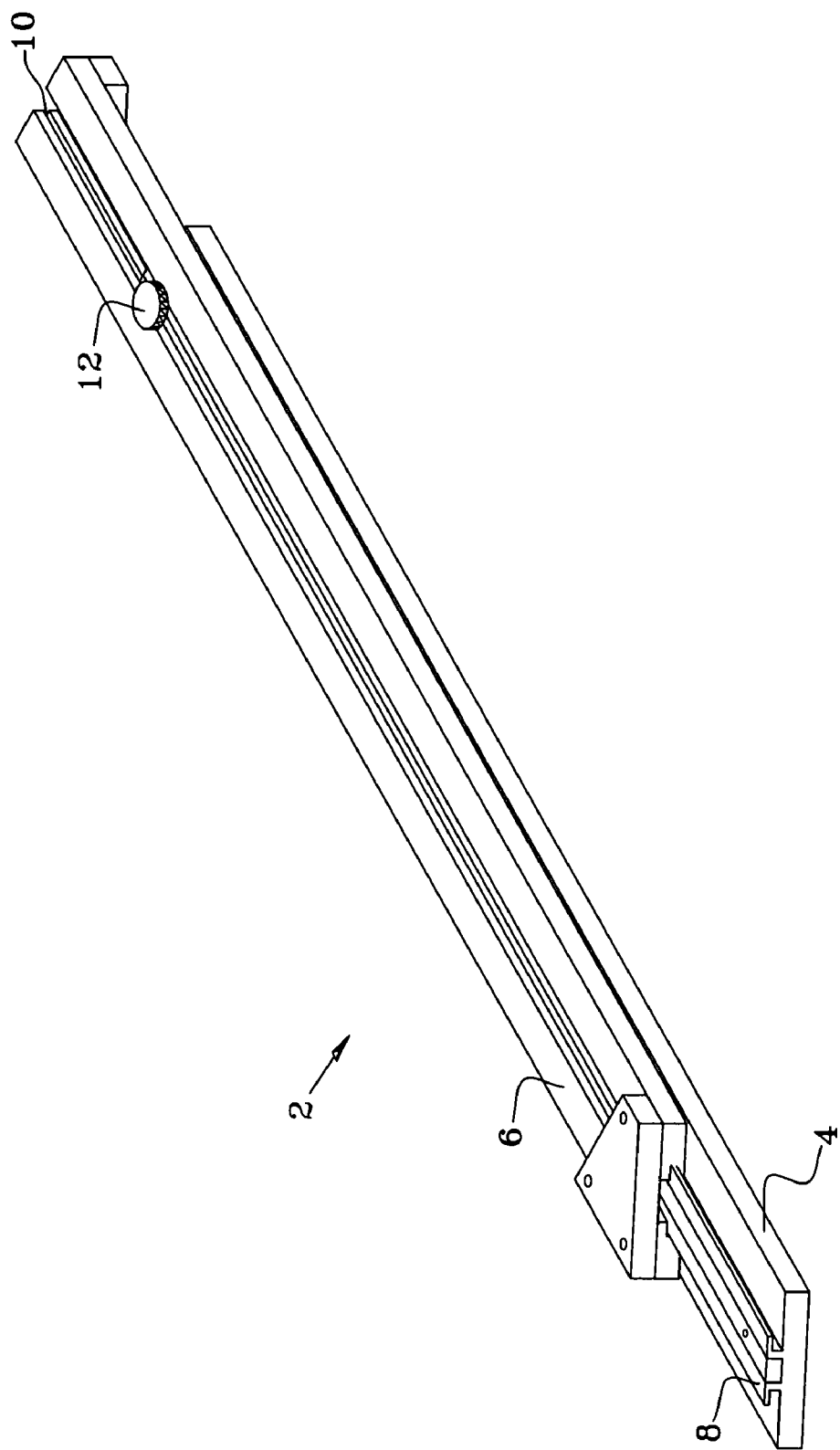
FIG. 2 is a second view isometric projection of the multi function gauge.
Figure 3A:
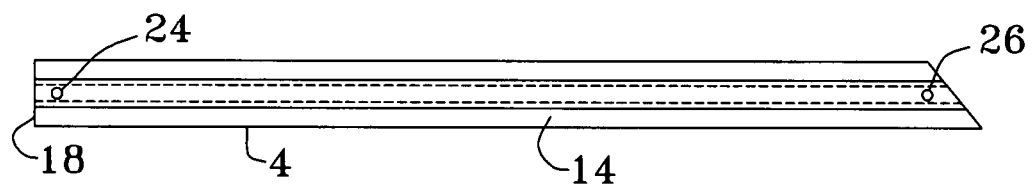
FIG. 3A is a top view of the first linear member.
Figure 3B:
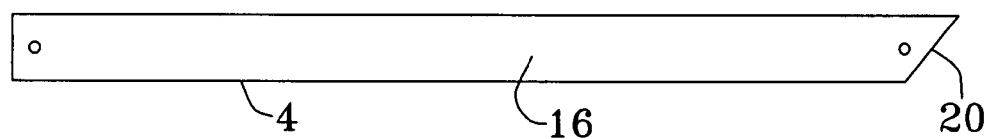
FIG. 3B is a bottom view of the first linear member.
Figure 3C:
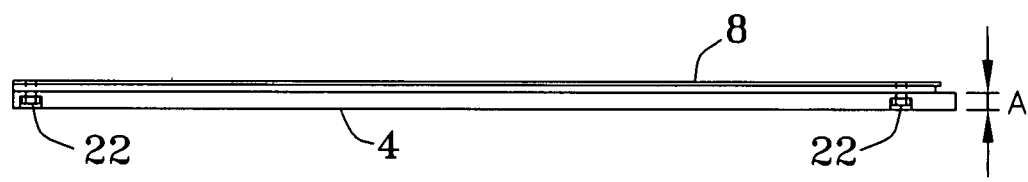
FIG. 3C is a cross-sectional view of the first linear member.
Figure 4A:
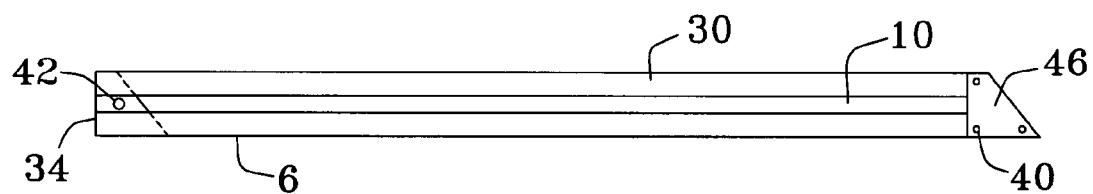
FIG. 4A is a top view of the second linear member.
Figure 4B:
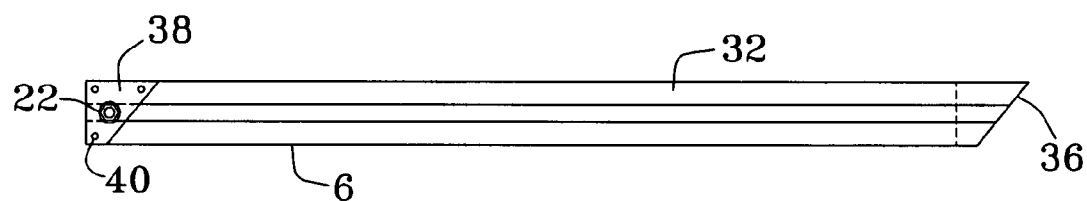
FIG. 4B is a bottom view of the second linear member
Figure 4C:
FIG. 4C is a cross-sectional view of the second linear member.

Looking at FIGS. 1 and 2 the main elements of the multi purpose adjustable measuring gauge 2 can be best seen. The first linear member 4 is extendably engagable with second linear member 6 by virtue of the insertion of the T-shaped track 8 into the matingly conformed T-shaped groove 10. Linear locking thumbscrew 12 tightens to frictionally bind the first linear member 4 and the second linear member 6 in any of the extended configurations of these elements.

Figure 11:
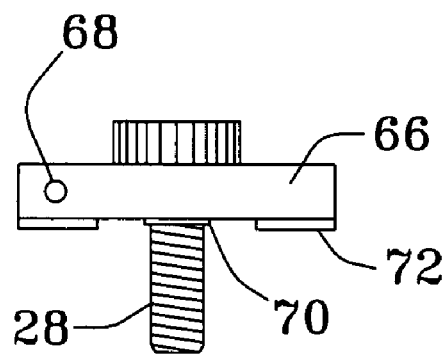
FIG. 11 is a is a side view of the second scribe retaining device.
Figure 12:
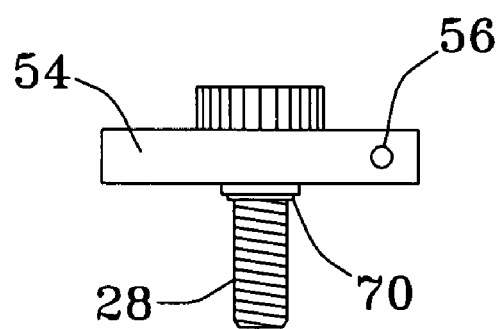
FIG. 12 is a side view of the first scribe retaining device.

Referring now to FIGS. 3-6 the first linear member can be best illustrated and described. First linear member 4 is of generally linear quadrilateral configuration, comprised of a uniform thickness A, a first planar face 14 and a second planar face 16, a proximal end 18, a distal end 20, and a T-shaped track 8. The proximal end 18 is squared and the distal end 20 is at a 45 degree angle (although alternate angles may be used this angle is the most common for woodworking applications.) Track 8 lies along the centerline of the first planar face 14 and extends the entire linear length of the first planar face 14 to slidably engage the matingly conformed groove 10 of the second linear member 6 (although different track and groove configurations may be utilized, this style has economic advantages.) Additionally, two nuts 22 are disposed and affixed through first opening 24 and second opening 26 and are threading engageable for coupling with a thumbscrew 28 (FIGS. 11 and 12). The heads of nuts 22 are recessed in the second face 16 so as to remain at least flush with the second face 16.

The second linear member 6 is of generally linear quadrilateral configuration of uniform thickness B substantially similar to the thickness A of first linear member 4. The second linear member 6 comprises a third planar face 30, a fourth planar face 32, a squared proximal end 34, an angled distal end 36 of 45 degrees, and a groove 10 extending along its entire linear length matingly conformed to the track 8 for slidable engagement with the first linear member 4. The second member 6 further comprises a proximal end plate 38 having a substantially similar thickness as that thickness A and B of both the first and second linear members 4,6 matingly affixed to the forth planar face 32 via three pop rivets 40 to the second linear member's proximal end 34 (although in a different type of fabrication the proximal end plate 38 and the second linear member 6 may be integrally formed.) Additionally, the proximal end plate 38 has a nut 22 disposed through an third opening 42 to be coupled with a thumbscrew 28 in a similar fashion as that described above. The nut 22 is recessed in the proximal end plate 38 so as to remain at least flush with the exposed face 44. A distal end plate 46 having a substantially similar thickness as that of thickness A and B of the first and second linear members 4 and 6 and that of proximal end plate 38, is matingly affixed via three rivets 40 to the third planar face 30 of second linear member's distal end 36. The distal end plate 46 and the proximal end plate 38 reside on opposite planar faces of the second linear member 6. The proximal end plate 38 matingly conforms to the distal end 20 of the first linear member 4, and the distal end plate 46 matingly conforms to the squared proximal end 18 of the first linear member 4. A thumb screw 28 is used to lock the first linear member 4 to the second linear member 6.

Figure 5:
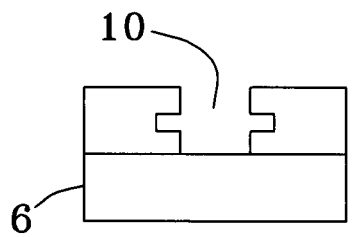
FIG. 5 is a proximal end view of the second linear member.

Looking at FIG. 5 the proximal end view of the second linear member 6 showing the groove 10 can be seen. This view is also identical for the distal end of the second linear member 6 when the second linear member is rotated end for end about the X-Y horizontal axial axis of the second linear member 6.

Figure 6:
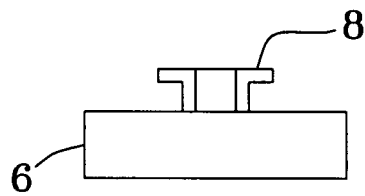
FIG. 6 is an is a proximal end view of the first linear member.
Figure 8:
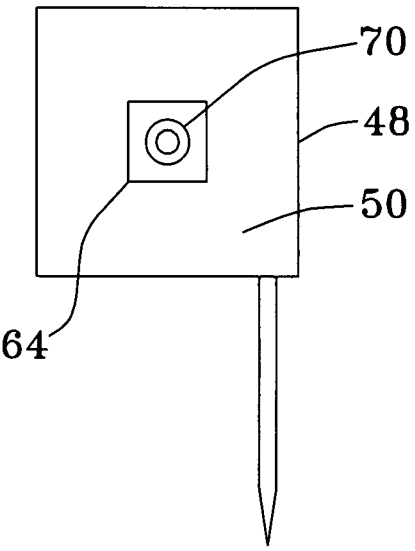
FIG. 8 is a bottom view of the first scribe retaining device.
Figure 7:
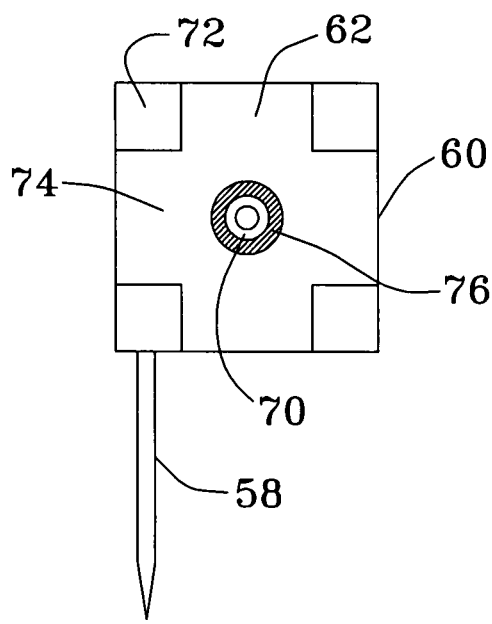
FIG. 7 is a bottom view of the second scribe retaining device.
Figure 9:
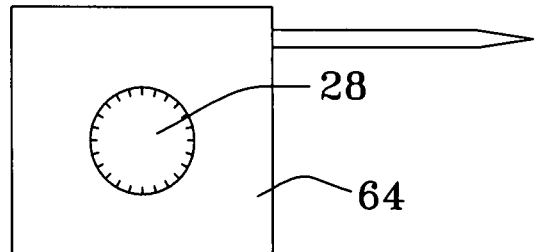
FIG. 9 is a top view of the second scribe retaining device.
Figure 10:
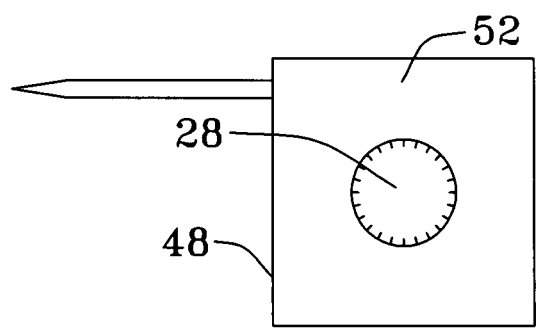
FIG. 10 is a top view of the first scribe retaining device.

Looking at FIG. 6 the proximal and distal end view of the first linear member 4 showing the track 8 can be seen.

Referring now to FIGS. 7 to 12, two scribe attachment devices can be seen. The first scribe attachment device 48 has a first planar face 50 a second planar face 52, and four substantially similar edge faces differing only wherein a first edge face 54 has an orifice 56 therein to accept and frictionally or mechanically constrain a scribe 58. The second scribe attachment device 60 has a first planar face 62 a second planar face 64, and four substantially similar edge faces with the four faces differing only wherein a first edge face 66 has an orifice 68 therein to accept and frictionally or mechanically constrain a scribe 58.

The first and second scribe attachment devices each have a central orifice (not illustrated) formed therethrough for the entry of thumbscrew 28 but differ in the configuration of their first planar faces 50 and 62. The first scribe attachment device 48 has a square plate 64 formed centrally thereon dimensioned so as to be received by groove 10 on the second linear member 6. There is a central orifice formed therethrough (not illustrated.) In this manner the square plate 64 of the first scribe attachment device 48 may be placed into groove 10 and the thumbscrew 28 tightened into the nut 22 recessed into third opening 42 of proximal end plate 38 so as to secure the first scribe attachment device 48 in a non rotatable fashion so as to be squared with the proximal end 34 of the second linear member 6. A retaining clip 70 is affixed to thumbscrew 22 to hold it on the first scribe attachment device 48. The first scribe attachment device 48 may be locked into any of four orientations each 90 degrees apart so that the scribe 58 may extent parallel or perpendicular to the longitudinal axis of the gauge 2.

The second scribe attachment device 60 has four substantially similar squared platforms 72 formed at its corners so as to form a depressed region 74 there between in the shape of a cross so as to allow the track 8 to reside in the depressed region 74 in any of the possible 90 degree rotations of the second scribe attachment 60. In this manner the second scribe attachment device 60 may be placed onto track 8 in any of the possible 90 degree rotations and the thumbscrew 28 tightened into the nut 22 recessed into first opening 4 of the first linear member 4 so as to secure the second scribe attachment device 60 in a non rotatable fashion so as to be squared with the proximal end 18 of the first linear member 4. A retaining clip 70 is affixed to thumbscrew 28 in a recess 76 to hold it on the second scribe attachment device 60 similar to that discussed above. The second scribe attachment device 60 may be locked into any of four orientations each 90 degrees apart so that the scribe 58 may extent parallel or perpendicular to the longitudinal axis of the gauge 2.

FIG. 11 shows a side view of the assembled second scribe attachment device 60 and FIG. 12 shows a side view of the assembled first scribe attachment device 48.

Figure 13:
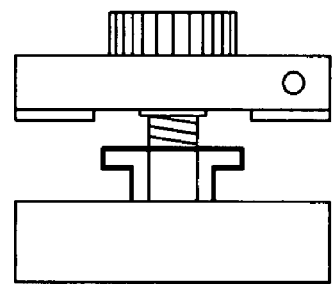
FIG. 13 is an end view of the second scribe retaining device partially frictionally affixed to the first linear member.
Figure 14:
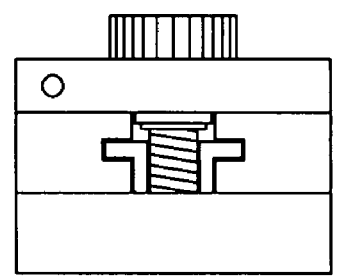
FIG. 14 is a end view of the first scribe retaining device frictionally affixed to the second linear member.

FIG. 13 shows a side view of the second scribe attachment device 60 partially engaged with the first linear member 4 and FIG. 14 shows a side view of the first scribe attachment device 48 fully engaged with the second linear member 6.

FIGS. 15 to 20 show the various configurations of the gauge 2 as can be accomplished by inverting and rotating the linear members. The interchangeablity and reversability of the first and second linear members allowing sliding engagement will be discussed with reference to the individual FIGS.

Figure 15:
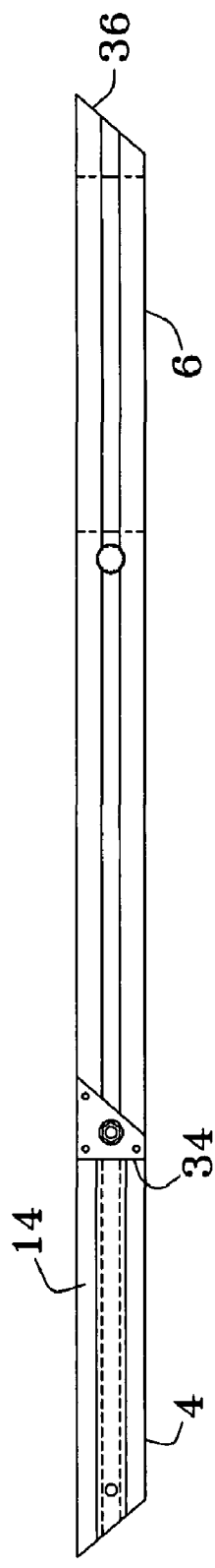
FIG. 15 is a top view of a first assembly configuration of the multi function gauge.

FIG. 15 is a configuration of the gauge 2 for measuring the distance between mitered edges. In this configuration the proximal end 18 of the first face 14 of the first linear member 4 engages the proximal end 34 of the third face 30 of the second linear member 6 such that the first face 14 of the first linear member 4 is in frictional contact with the third face 30 of the second linear member 6.

Figure 16:
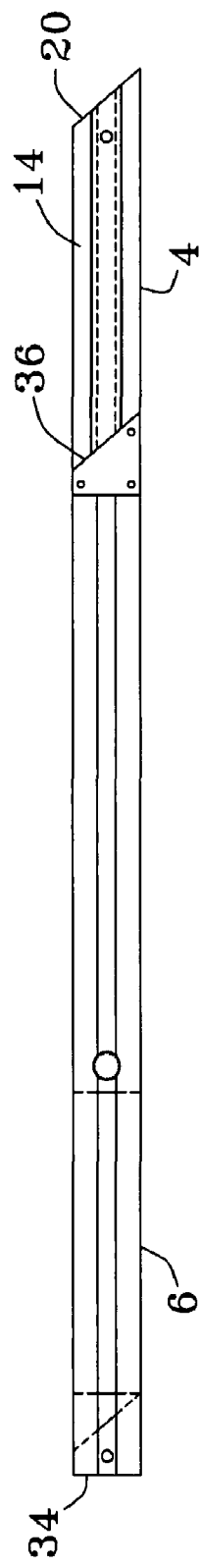
FIG. 16 is a top view of a second assembly configuration of the multi function gauge.

FIG. 16 is a configuration of the gauge 2 for measuring the distance between a square end to a left hand miter. In this configuration the proximal end 18 of the first linear face 14 of the first linear member 4 engages the distal end 36 of the fourth face 32 of the second linear member 6 such that the first face 14 of the first linear member 4 is in frictional contact with fourth face 32 of the second linear member 6.

Figure 17:
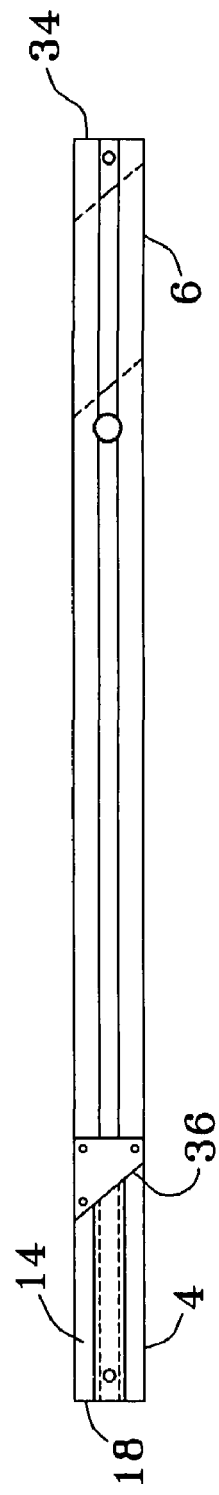
FIG. 17 is a top view of a third assembly configuration of the multi function gauge.

FIG. 17 is a configuration of the gauge 2 for measuring the distance between squared ends. In this configuration the distal end 20 of the first face 14 of the first linear member 4 engages the distal end 36 of the fourth face 32 of the second linear member 6 such that the first face 14 of the first linear member 4 is in frictional contact with the fourth face 32 of the second linear member 6.

FIG. 18 is a configuration of the gauge 2 for measuring the distance between square end to a right hand miter. In this configuration the distal end 20 of the first face 14 of the first linear member 4 engages the proximal end 34 of the third face 30 of the second linear member 6 such that the first face 14 of the first linear member 4 is in frictional contact with the third face 30 of the second linear member 6.

FIG. 19 is a configuration of the gauge 2 for measuring diagonal distances. In this configuration the distal end 20 of the first face 14 of the first linear member 4 engages the distal end 36 of the fourth face 32 of the second linear member 6 such that the first face 14 of the first linear member 4 is in frictional contact with the fourth face 32 of the second linear member 6. The first scribe attachment device 48 is fictionally affixed onto the proximal end of the third face 30 of the second linear member 6 such that the scribe 58 extends parallel to the longitudinal axis of the gauge 2. The second scribe attachment device 60 is frictionally affixed onto the proximal end 18 of the first face 14 of the first linear member 4 such that the scribe 58 extends parallel to the longitudinal axis of the gauge 2.

FIG. 20 is a configuration of the gauge 2 for scribing arcs or circles. In this configuration the distal end 20 of the first face 14 of the first linear member 4 engages the distal end 36 of the fourth face 32 of the second linear member 6 such that the first face 14 of the first linear member 4 is in frictional contact with the fourth face 32 of the second linear member 6. The first scribe attachment device 48 is locked onto the proximal end of the third face 30 of the second linear member 6 such that the scribe 58 extends perpendicular to the longitudinal axis of the gauge 2. The second scribe attachment device 60 is locked onto the proximal end of the first face 14 of the first linear member 4 such that the scribe 58 extends perpendicular to the longitudinal axis of the gauge 2.

The multi function gauge 2 could be formed from wood, light weight metals, steels, alloys, plastics, or any combination thereof. Although described as use for woodworking, the present invention is equally applicable to use in all other fields where precise measurement is critical such as metalworking, drafting, pattern making and the like.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. In the way of an example, it is known that different fabricating methods such as extrusion, welding, riveting etc. may result in the incorporation of two or more elements into a monolithic structure. Such may be the case of the incorporation of the distal and proximal end plates with either of the linear quadrilateral members.

Having thus described the invention, what is claimed as new and desired to be secured by Letters Patent is as follows:

1. A multi purpose adjustable measuring gauge comprising:
   a first generally linear quadrilateral member of a first uniform thickness having a first planar face, a second planar face, a squared proximal end, an angled distal end, and a track formed thereon extending along a longitudinal axis thereof;
   a second generally linear quadrilateral member of a second uniform thickness having a third planar face, a fourth planar face, a squared proximal end, an angled distal end, and a groove extending along a longitudinal axis thereof matingly conformed to said track for slidable engagement with said first member, wherein said second member further comprises a proximal end plate of said first thickness matingly affixed to said third planar face at second linear member's proximal end and a distal end plate of said first thickness matingly affixed to said fourth planar face at second linear member's distal end, and wherein said distal end plate and said proximal end plate reside on opposite planar faces of said second linear member, and wherein said proximal end plate matingly conforms to said distal end of said first linear member, and said distal end plate matingly conforms to said squared proximal end of said first linear member.

2. The multi purpose adjustable measuring gauge gauge of claim 1 further comprising a first locking device thereon to secure the first linear member relative to the second linear member.

3. The multi purpose adjustable measuring gauge of claim 2 wherein said first locking device is further comprised of a thumbscrew, and wherein first linear member has a matingly engageable threaded orifice formed therein, such that thumbscrew passes through said groove of said second linear member and engages said orifice of said first linear member so as to frictionally secure the first linear member relative to the second linear member.

4. The multi purpose adjustable measuring gauge of claim 1 wherein said first uniform thickness and said second uniform thickness are substantially similar.

5. The multi purpose adjustable measuring gauge of claim 1 wherein said groove is centered about the longitudinal axis of said second linear member so as to enable interchangeable and reversible sliding engagement between said first linear member and said second linear member to form a configuration selected from the group consisting of the following configurations: the distal end of the first face of said first member matingly engages the proximal end of the third face of said second member (square to miter right hand); the proximal end of the first face of the said first member matingly engages the proximal end of the third face of said second member (miter to miter); the distal end of the first face of said first member matingly engages the distal end of the forth face of said second member (square to square); proximal end of the first face of said first member matingly engages the distal end of the forth face of the said second member (square to miter left hand).

6. The multi purpose adjustable measuring gauge of claim 5 further comprising a first locking device thereon to secure the first linear member relative to the second linear member.

7. The multi purpose adjustable measuring gauge of claim 6 wherein said first locking device is further comprised of a thumbscrew, and wherein said first linear member has a matingly engageable threaded orifice formed therein, such that thumbscrew passes through said groove of said second linear member and engages said orifice of said first linear member so as to frictionally secure the first linear member relative to the second linear member.

8. The multi purpose adjustable measuring gauge of claim 7 wherein the proximal end plate of said second linear member has a second threaded orifice formed therein to receive a first substantially square retaining apparatus of said first uniform thickness having two planar faces and four edge faces; wherein at least one edge face contains a receiving orifice formed therein for receiving a matingly conformed scribe and wherein said first retaining apparatus further comprises a second locking device therethrough matingly engageable with said second threaded orifice to secure said first retaining apparatus to said second linear member.

9. The multi purpose adjustable measuring gauge of claim 8 wherein said second locking device comprises a thumbscrew, such that the thumbscrew passes through said groove of said second linear member and engages said orifice of said proximal end plate of said second linear member so as to frictionally secure said first retaining apparatus to said second linear member.

10. The multi purpose adjustable measuring gauge of claim 9 wherein said first retaining apparatus further comprises a substantially square plate on its second planar face of dimensions matingly engageable to that of said groove of said second member thereby allowing said first retaining apparatus and said scribe therein to be frictionally affixed to said second linear member in four distinct positions, each position 90 degrees apart.

11. The multi purpose adjustable measuring gauge of claim 10 wherein the proximal end of said first linear member has a third threaded orifice formed therein to receive a second primarily square retaining apparatus of uniform thickness having two planar faces and four edge faces; wherein at least one edge face contains a receiving slot therein for receiving a second scribe and wherein said second retaining apparatus further comprises a third locking device therethrough matingly engageable with said third threaded orifice to secure said second primarily square retaining apparatus to said first linear member.

12. The multi purpose adjustable measuring gauge of claim 11 wherein said third locking device comprises a thumbscrew, such that the thumbscrew engages said orifice of said proximal end of said first linear member so as to frictionally secure said second retaining apparatus to said first linear member.

13. The multi purpose adjustable measuring gauge of claim 12 wherein said second retaining apparatus further comprises four substantially square plates affixed on each corner on its second planar face of dimensions matingly engageable to that of said track of said first linear member thereby allowing said second retaining apparatus and said second scribe therein to be frictionally affixed to said first linear member in four distinct positions, each position 90 degrees apart.

14. The multi purpose adjustable measuring gauge of claim 13 wherein said first and second scribes are trammel points.

15. The multi purpose adjustable measuring gauge of claim 13 where in said first and second scribes are any combination of trammel points, graphite writing utensils, ink writing utensils, or chalk writing utensils.

\* \* \* \* \*